(12) United States Patent
Peeters

(10) Patent No.: US 11,753,946 B2
(45) Date of Patent: Sep. 12, 2023

(54) AERODYNAMIC OR HYDRODYNAMIC BLADE MADE OF LAYERED MATERIAL

(71) Applicant: FiberCore IP B.V., Rotterdam (NL)

(72) Inventor: Johannes Hendricus Alphonsus Peeters, Rotterdam (NL)

(73) Assignee: FiberCore IP B.V., Rotterdam (NL)

( * ) Notice: Subject to any disclaimer, the term of this patent is extended or adjusted under 35 U.S.C. 154(b) by 870 days.

(21) Appl. No.: 16/481,835

(22) PCT Filed: Jan. 31, 2018

(86) PCT No.: PCT/NL2018/050068
§ 371 (c)(1),
(2) Date: Jul. 30, 2019

(87) PCT Pub. No.: WO2018/143802
PCT Pub. Date: Aug. 9, 2018

(65) Prior Publication Data
US 2020/0149419 A1    May 14, 2020

(30) Foreign Application Priority Data
Jan. 31, 2017   (NL) ..................................... 2018263

(51) Int. Cl.
*F01D 5/28*     (2006.01)
*B32B 15/20*    (2006.01)
(Continued)

(52) U.S. Cl.
CPC .............. *F01D 5/282* (2013.01); *B32B 15/20* (2013.01); *C04B 35/62695* (2013.01);
(Continued)

(58) Field of Classification Search
CPC ... F01D 5/282; F01D 5/12; F01D 5/14; F01D 5/147; B64C 3/20; B64C 3/24;
(Continued)

(56) References Cited
U.S. PATENT DOCUMENTS 2,362,301 A * 11/1944 Pecker ................. B64C 27/473
                                                  416/20 R
2,410,609 A * 11/1946 Pecker ................. B64C 27/473
                                                  244/123.3
(Continued)

FOREIGN PATENT DOCUMENTS

DE      19836629 C1   10/1999
EP      1 070 661 A2   1/2001
(Continued)

*Primary Examiner* — J. Todd Newton
*Assistant Examiner* — Wayne A Lambert
(74) *Attorney, Agent, or Firm* — N.V. Nederlandsch Octrooibureau

(57) ABSTRACT

A blade made of layered material, such as composite material, configured for exposure to a fluid flow, comprises skins (1, 2) defined between a leading edge (3) and a trailing edge (4) which skins in cross-section form a flow profile. The layered material may consist of several layers of fiber material (5, 5', ...) impregnated with a matrix material, wherein layers of fiber material each comprise a respective body portion (6, 6', ..., 13) between and transverse to the skins and each at least a respective skin portion (7, 7', ...; 8, 8', ...) that forms part of the skins. The said skin portions all extend from the related body portion in the direction of the trailing edge. Of said skin portions at least two consecutive skin portions of the one skin overlap and/or two consecutive skin portions of the other skin overlap each other.

19 Claims, 2 Drawing Sheets

(51) Int. Cl.
*F01D 5/14* (2006.01)
*C04B 35/626* (2006.01)
*F01D 5/12* (2006.01)
*C04B 35/628* (2006.01)
*C04B 41/50* (2006.01)
*C04B 41/45* (2006.01)
*B64C 11/26* (2006.01)
*B64C 3/20* (2006.01)
*B64C 27/473* (2006.01)

(52) U.S. Cl.
CPC ............... *F01D 5/12* (2013.01); *F01D 5/14* (2013.01); *B64C 3/20* (2013.01); *B64C 11/26* (2013.01); *B64C 27/473* (2013.01); *C04B 35/628* (2013.01); *C04B 35/62802* (2013.01); *C04B 35/62805* (2013.01); *C04B 35/62815* (2013.01); *C04B 41/4505* (2013.01); *C04B 41/50* (2013.01); *F01D 5/147* (2013.01); *Y02E 10/72* (2013.01)

(58) Field of Classification Search
CPC ........... B64C 3/18; B64C 11/26; B64C 11/24; B64C 27/473; B64C 9/00; B29D 99/0025; B63H 1/26; F03D 1/0675; Y02E 10/72; B32B 15/20; C04B 35/62695; C04B 35/628; C04B 35/62802; C04B 35/62805; C04B 35/62815; C04B 41/4505; C04B 41/50
See application file for complete search history.

(56) References Cited

U.S. PATENT DOCUMENTS

| | | | | |
|---|---|---|---|---|
| 2,588,570 A | * | 3/1952 | Pitcairn | F01D 5/282 416/226 |
| 2,827,967 A | | 3/1958 | Schliekelmann | |
| 3,176,775 A | * | 4/1965 | Clemens | B64C 27/473 416/241 A |
| 3,321,019 A | * | 5/1967 | Dmitroff | B64C 27/48 416/241 A |
| 3,967,996 A | * | 7/1976 | Kamov | B29C 49/44 244/17.11 |
| 4,051,289 A | * | 9/1977 | Adamson | B32B 3/18 428/116 |
| 4,105,817 A | | 8/1978 | Dunahoo | |
| 4,213,739 A | * | 7/1980 | Euler | B29D 99/0025 416/226 |
| 4,806,077 A | * | 2/1989 | Bost | B64C 27/473 416/144 |
| 4,935,277 A | * | 6/1990 | Le Balc'h | B64C 27/473 428/116 |
| 5,921,754 A | * | 7/1999 | Freitas | B29C 70/345 264/258 |
| 6,638,466 B1 | * | 10/2003 | Abbott | B29C 33/68 264/258 |
| 9,638,048 B2 | * | 5/2017 | Measom | B64C 27/473 |
| 10,005,242 B2 | * | 6/2018 | Measom | B23P 15/04 |
| 2002/0195524 A1 | * | 12/2002 | Amaoka | B64C 3/20 244/123.2 |
| 2003/0116262 A1 | | 6/2003 | Stiesdal et al. | |
| 2010/0278648 A1 | * | 11/2010 | Kuntze-Fechner | B29C 70/545 416/134 A |
| 2013/0068389 A1 | * | 3/2013 | Overgaard | B29C 70/34 156/324 |
| 2014/0284431 A1 | | 9/2014 | Grankaell et al. | |
| 2015/0064013 A1 | * | 3/2015 | Measom | B64C 27/473 29/889.71 |
| 2015/0152733 A1 | * | 6/2015 | Moffitt | B64C 27/82 416/1 |
| 2015/0375846 A1 | | 12/2015 | Garcia et al. | |

FOREIGN PATENT DOCUMENTS

| | | | | |
|---|---|---|---|---|
| EP | 1 070 661 A3 | 3/2003 | | |
| EP | 1669547 B1 | 9/2011 | | |
| GB | 245408 A | 4/1926 | | |
| NL | 2001830 C | 1/2010 | | |
| WO | WO-2010008293 A2 | * | 1/2010 | ............. B29C 70/42 |

* cited by examiner

AERODYNAMIC OR HYDRODYNAMIC BLADE MADE OF LAYERED MATERIAL

FIELD OF THE INVENTION

The invention relates to a blade made of layered material, such as composite material, for exposure to a fluid flow, in particular an aerodynamic blade such as a vane for a wind turbine, an airfoil for an airplane and the like. The invention also relates to hydrodynamic surfaces, such as a keel or propeller blade for a ship's screw.

STATE OF THE ART

It is known to make vanes of composite material. Examples thereof can be found in EP2182203, EP2363602, GB2528850, US2003/0116262, US2013068389, US2013/0101430, US2014284431. These known suggestions for a vane all regard a structure in which both the skin of the blade and the spars that ensure transmission of the forces, consist of composite material. The skins consist of continuous layers of fiber material extending between the leading edge and the trailing edge of the blade flow profile. The spars are attached to the interior surface of the skins. Usually, the spars comprise a body having flanges at both outer ends, which flanges ensure the adhesion to the skins. U.S. Pat. No. 2,410,609 regards a rotor blade having a corresponding structure. In the interior of this rotor blade U-shaped nested parts have also been incorporated, the legs of which are pointing to the leading edge.

As known, such aerodynamic surfaces are exposed to highly fluctuating loads. Although the impregnated fiber material the blades are composed of are well resistant to such load fluctuations, problems may nevertheless occur. Such problems mainly relate to the layers the composite material consists of, getting detached. This phenomenon may in particular occur in case of relatively high load concentrations.

In that connection, as it turns out, the adhesion between the skins and the spars may result in problems. The adjacent layers of the spar and the skin may then give cause to detachment. Furthermore, delamination may occur in the skins themselves. The layers of fiber material of the skin, as stated, extend continuously between the leading edge and the trailing edge of the flow profile, as a result of which delamination may progress across the entire flow profile without being hindered.

It is therefore desirable to provide a blade made of composite material that is better resistant to detachment and delamination. It may be desirable to provide such a blade wherein the adhesion between the skins and the spars is more resistant to symptoms of fatigue. It is furthermore desirable to provide a blade wherein the skins themselves are more resistant to symptoms of fatigue.

BRIEF DESCRIPTION OF THE INVENTION

According to a first aspect a blade of layered material is therefore provided, which blade is configured for exposure to a fluid flow, comprising skins defined between a leading edge and a trailing edge, which skins in cross-section form a flow profile, wherein the layered material comprises several layers of material, wherein layers of material each comprise a respective body portion between and transverse to the skins and each at least a respective skin portion that forms part of the skins, wherein said skin portions all extend from the related body portion in the direction of the trailing edge, and wherein of said skin portions at least two consecutive skin portions of the one skin and/or two consecutive skin portions of the other skin overlap each other.

In the blade according to this aspect, the material of the body integrally merges into the material of the skins. The body and the skin portions constituting the skin are in each case part of one and the same layer of material. In that sense, the body is not merely glued to the internal surface of the skins by means of an adhesive layer but is an integral part of the skins. As a consequence, this reduces the risk of delamination. A further advantage of such a structure wherein the bodies continue to be prolonged in the skins is that the skins themselves are composed of skin portions that overlap each other in such a way, that progression of any start of delamination is limited.

Moreover, in terms of flow, the blade has an advantageous structure as the skin portions in question extend from the bodies towards the trailing edge. This is shown in particular in one embodiment, wherein layers of material each comprise a respective body portion and each on either side of the body portion in each case comprise a respective skin portion that forms part of the one skin and a respective skin portion that forms part of the other skin, while forming layers of material that are U-shaped and nested in each other.

Preferably, skin portions that form part of the one skin and/or the other skin in cross-section have a dimension that is smaller than the chord or the camber line of the flow profile. Depending on the dimension of said skin portions, the thickness and/or strength and/or rigidity of the skins can be locally influenced. For that purpose, skin portions that form part of the one skin and/or of the other skin may have different dimensions in cross-section.

Furthermore, the skin portions that form part of the one skin and/or of the other skin may at the most partially overlap each other in cross-section. This may furthermore be shown in a variety wherein, when considered in cross-section, a first skin portion that forms part of the one skin or the other skin, respectively, covering a second skin portion that forms part of the one skin or the other skin, respectively, ends at greater distance from the trailing edge than the second skin portion does.

In embodiments, three or more consecutive skin portions of the of the one skin overlap each other, and/or three or more consecutive skin portions of the other skin overlap each other. This degree of overlap may be realized in part of the layers of material in the blade, or even in all of the layers of material in the blade.

In embodiments, a spar may be provided which consists of at least a body portion of a layer of material that comprises a body portion between and transverse to the skins and at least a skin portion that forms part of the one skin and/or at least a skin portion that forms part of the other skin, and optionally a layer of supporting material. Preferably, the layer of supporting material is enclosed between two body portions of a respective layer of material.

To further increase the strength and rigidity of the blade, at least two spaced apart spars may be provided, which spars and the areas of skin extending in between them define a torsion box. The structure of the torsion box can be adjusted by selecting the number of skin portions in a central area of the of the one skin or the other skin, respectively, which central area is situated spaced apart from the leading edge and the trailing edge, to be higher than the number of skin portions in an edge area of the of the one skin or the other skin, respectively, which edge area is adjacent to the leading edge and/or the trailing edge.

Furthermore, it is possible to form the skins from additional skin portions that do not belong to the layers of material that also have a body portion. For that purpose, between two overlapping skin portions of the layers of material comprising a body portion between the skins and at least a skin portion that forms part of the one skin and/or at least a skin portion that forms part of the other skin, an additional skin portion may be situated that exclusively extends within the one skin or exclusively within the other skin.

In a blade of which at least three consecutive layers of material each comprise a body portion between and transverse to the skins as well as at least a skin portion that forms part of the one skin and/or at least a skin portion that forms part of the other skin, said skin portions may have respective consecutive ends that are spaced apart from each other in the one skin or the other skin, respectively.

Furthermore, at least a skin portion of the one skin and/or at least a skin portion of the other skin, may have an end that is free at the exterior of the one skin or at the exterior of the other skin, respectively. The integral nature of the skins and bodies is particularly clear in one embodiment wherein, of layers of material that comprise a body portion between and transverse to the skins as well as at least a skin portion that forms part of the one skin and/or at least a skin portion that forms part of the other skin, at least one skin portion has an end that is free at the exterior of the one skin or the exterior of the other skin, respectively.

Alternatively, or in addition to the embodiment described above, layers of material may extend continuously between the trailing edge and the leading edge, which continuous layers of fiber material cover the skin portions of the layers of fiber material that comprise a body portion between the skins and at least a skin portion that forms part of the one skin or a skin portion that forms part of the other skin.

The layers of material may for instance consist of fiber material. It may in particular be about composite material, having fiber layers that are impregnated with a matrix material. The strength and/or rigidity of the skins can then be influenced as desired by an appropriate choice of the fiber direction of the fiber material. For instance, a fiber direction of a layer of fiber material may be parallel to the cross-section defining the flow profile, and/or a fiber direction of a layer of fiber material may be oriented at ±45° to the cross-section defining the flow profile, and/or a fiber direction of a layer of fiber material may be oriented at 90° to the cross-section defining the flow profile. To further reinforce the structure of the blade, a filler, such as a foam material may be present between the skins and the bodies. It may in particular regard a block of foam material, more in particular a block of foam material enveloped in a layer of fiber material.

Other materials apart from fiber material may also be used. Alternatively, the layers of material may for instance consist of aluminum. They are adhered to each other and to fillers, if any, in the known manner.

As already stated above, the blade may be configured as an aerodynamic blade for exposure to an air flow or gas flow. In that case, one of the skins forms an underpressure skin and the other skin forms an overpressure skin. In addition, the camber line of the flow profile may be curved; the skins may run asymmetrically relative to the chord of the flow profile. In particular, such a blade may be configured as a vane for a wind turbine, or as airfoil for an airplane, or as steering surface for an airplane, or as propeller blade for an airscrew, or as flap/aileron for an airplane, or as winglet for an airplane.

The blade may further be configured as hydrodynamic blade for exposure to a fluid flow, wherein the camber line is a straight line and the skins are symmetrical relative to the camber line. Examples thereof are a keel or a rudder blade or a leeboard or a hydrofoil for a vessel.

For that matter, the hydrodynamic blade may be typified by an underpressure skin and the other skin an overpressure skin, such as they occur in case of a stabilizer blade for a vessel or in case of a propeller blade of a ship's screw.

The flow profile may at the leading edge have a curvature with a relatively large radius of curvature and at the trailing edge have a curvature with a relatively small radius of curvature or be pointed at the trailing edge.

Considered in cross-section, at least one of the skins may be convexly curved between the leading edge and the trailing edge over at least half said skin, preferably over at least ¾ of said skin, most preferably over the entire distance of said skin. The curvature usually is a convex curvature, although embodiments are also possible that have a convexly curved skin portion that merges into a concavely curved skin portion via a point of inflexion. In cross-section, the skins are usually configured together as a closed enveloping and may form an entirely smooth contour.

The at least one spar may at an end of the blade be provided with coupling means for coupling the blade to a support, such as a hub of a wind turbine, a body of an airplane and the like.

As known, the leading edge of a flow profile is the edge facing the attacking flow. The flow is directed from the leading edge to the trailing edge. The flow leaves the flow profile at the location of the trailing edge.

Reference is made to the hollow rotor blade as known from U.S. Pat. No. 2,827,967. Said known blade has U-shaped nested blades, the legs of which are oriented towards leading edge of the flow profile. In order to obtain a shape that is acceptable in terms of flow, it is necessary to use a separate nose spar, which together with the legs attached thereto must be subjected to a machining treatment. Apart from the drawback that this known blade is laborious and costly as a result, a further drawback is its vulnerability. In reality, the forwardly oriented ends of the U-shaped plates are exposed to a strong air flow and any particles that may be taken along in said flow. This entails the risk of the layers in question being "peeled off" and in the end getting detached.

According to a second aspect, and in accordance with the advantages and effects described above, the invention provides a use of a blade according to the first aspect in an aerodynamic or hydrodynamic flow. While using the blade, the flow reaches the blade at the leading edge, subsequently flows along the blade from the leading edge towards the trailing edge of the blade, and the flow leaves the blade at the trailing edge.

BRIEF DESCRIPTION OF THE FIGURES

The invention will further be described on the basis of the exemplary embodiment shown in the figure.

DESCRIPTION OF THE EMBODIMENTS

Figure 1:
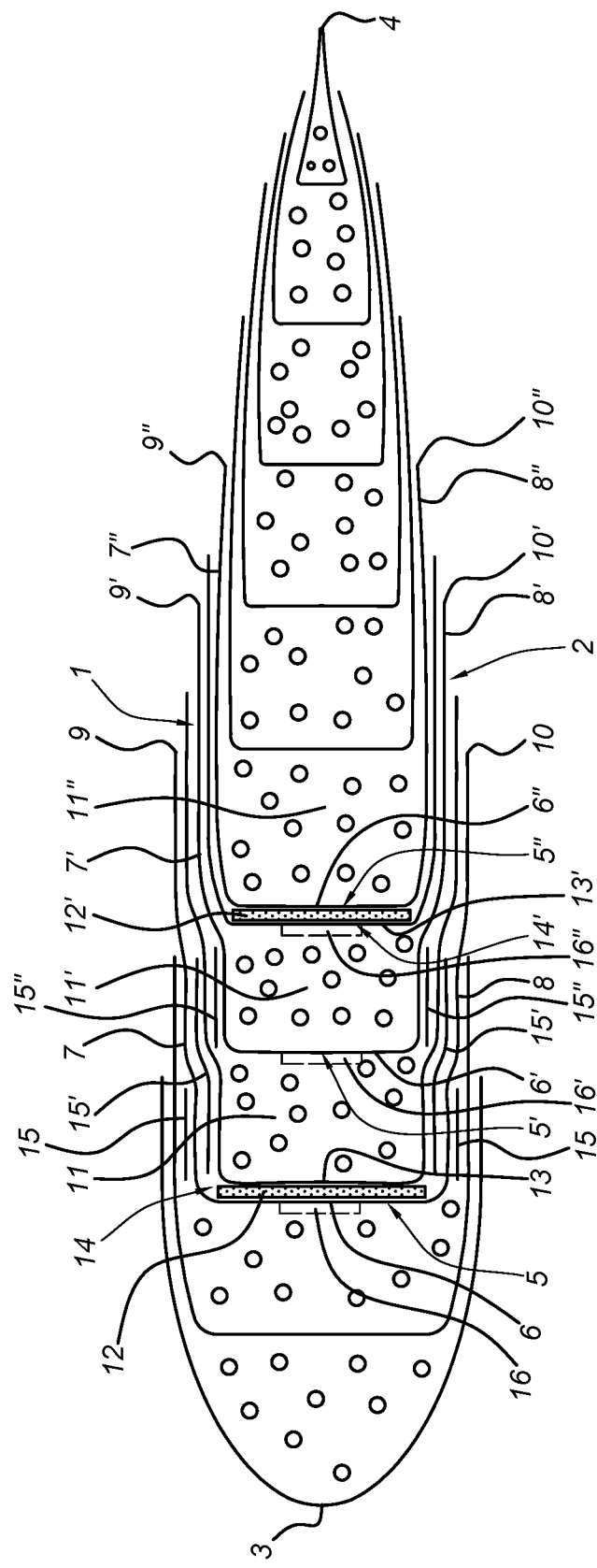
FIG. 1 shows an exploded view in cross-section of the profile of a blade.

FIG. 1 shows a slightly exploded view of the profile of an aerodynamic blade. The blade has an underpressure skin 1 and an overpressure skin 2 extending between the leading edge 3 and the trailing edge 4. The blade is built up from layers of fiber material 5, 5', . . . that each consist of a body portion 6, 6', . . . , a skin portion 7, 7', . . . that forms part of the underpressure skin 1 as well as a skin portion 8, 8', . . . that forms part of the overpressure skin 2. The layers of fiber material 5, 5', . . . all have a U-shape, wherein the legs of the U-shape are oriented towards the trailing edge 4. This is advantageous in terms of aerodynamics.

The skin portions 7, 7', . . . of the underpressure skin 1 overlap each other partially, and in the exemplary embodiment shown each have an end 9, 9', . . . that is free at the exterior of the underpressure skin. Likewise, the skin portions 8, 8', . . . of the overpressure skin 2 overlap each other, wherein they have a free end 10, 10', . . . that is free at the exterior of the overpressure skin.

Between the body portions 5, 5', . . . there are in each case fillers in the form of foam blocks 11, 11', . . . . The body portions 5, 5" are each adhered to a surface of a supporting foam layer 12, 12'. A body portion 13, 13' is also adhered to the other surface of the supporting foam layer 12. In that way the spars 14, 14' are formed. Two of such spars are spaced apart from each other and together with the parts of the underpressure skin 1 and the overpressure skin 2 situated in between, form a torsion box. The body portions 13, 13' at the other surface of the supporting foam layer 12, 12' also form part of U-shaped layers of fiber material.

Between the skin portions 7, 7', . . . ; 8, 8', . . . of the layers of fiber material 5, 5', . . . that have a body portion 6, 6', . . . , further layers of fiber material 15, 15', . . . are provided that serve to reinforce the skins locally. Said further layers of fiber material 15 exclusively extend into those skins 1, 2, and are not provided with a body portion.

Figure 2:
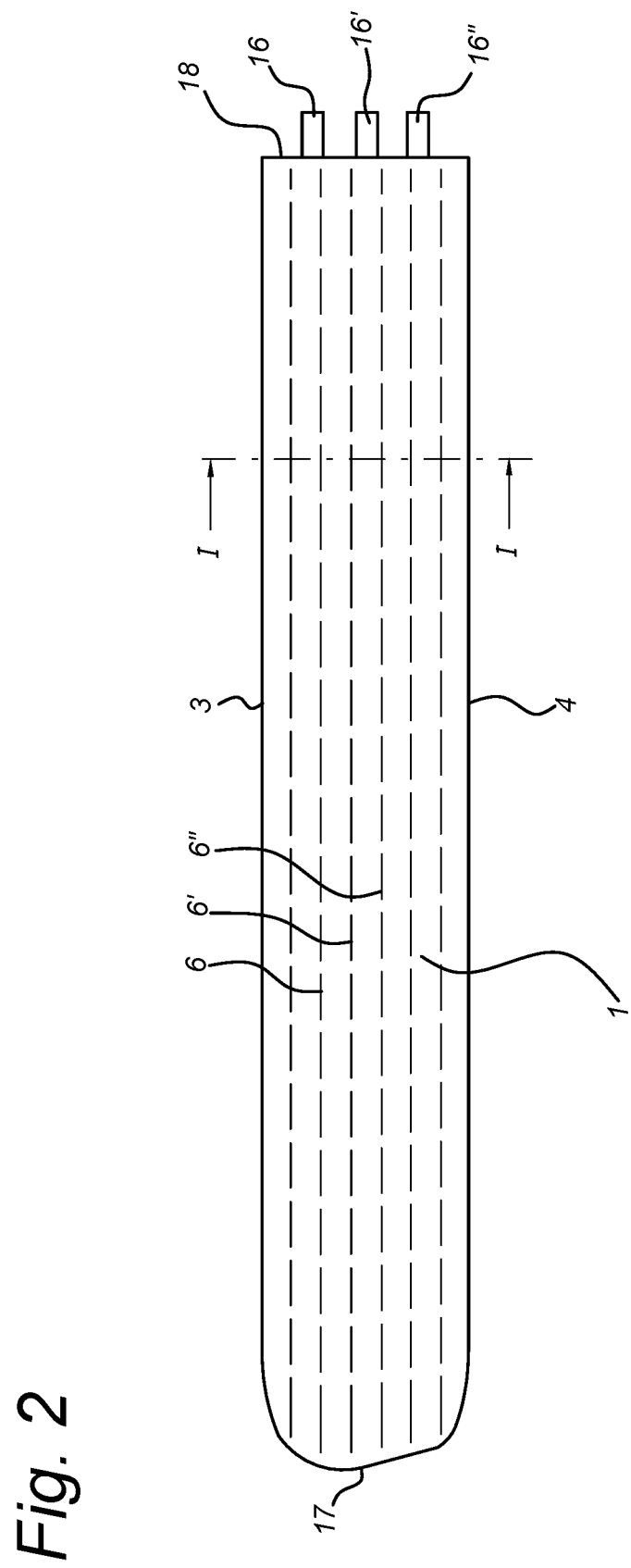
FIG. 2 shows a top view of the blade.

The top view of FIG. 2 shows that the blade extends between the free end 17 and the opposite end 18 that has to be attached to for instance the hub of a wind turbine or the body of an airplane. For that purpose, some body portions 6, 6', 6", . . . are provided with coupling means 16, 16', 16", . . . . In particular the spars 14, 14', of which the body portions 6, 6" are part, are provided with such coupling means 16, 16". This may for instance regard fittings that can be attached to associated counterparts of a wind turbine hub, or an airplane body and the like.

Although in the above there is question of fiber material, another material can also be used for U-shaped layers with skin portions and body portions, such as a metal for instance aluminum. Instead of foam material other suitable fillers are also possible

LIST OF REFERENCE NUMBERS

1. Underpressure skin
2. Overpressure skin
3. Leading edge
4. Trailing edge
5, 5', . . . Layer of fiber material
6, 6', . . . Body portion
7, 7', . . . Skin portion
8, 8', . . . Skin portion
9, 9', . . . Free end skin portion
10, 10', . . . Free end skin portion
11, 11', . . . Foam material filler
12, 12', . . . Layer of supporting foam material
13, 13', . . . Body portion
14, 14' Spar
15, 15', . . . Layer of fiber material
16, 16', . . . Coupling means

The invention claimed is:

1. A blade made of layered material, the blade being configured to be exposed to a fluid flow, and comprising skins defined between a leading edge and a trailing edge of the blade, said skins including a first skin and a second skin and forming a flow profile in cross-section, wherein the layered material comprises several layers of material, the layers of material each comprising a respective body portion between and transverse to the skins and each has at least a respective skin portion that forms part of the skins, wherein said skin portions all extend from the related body portion in a direction of the trailing edge, and wherein of said skin portions at least two consecutive skin portions of the first skin or of the second skin overlap each other, and further wherein at least a skin portion of the first skin or of the second skin has an end that is free at the exterior of the first skin or of the second skin.

2. The blade according to claim 1, wherein one or more layers of fiber material of the layered material each comprise a respective body portion and each on either side of the body portion in each case a respective skin portion that forms part of the first skin and a respective skin portion that forms part of the second skin, while forming layers of material that are U-shaped and nested in each other.

3. The blade according to claim 1, wherein skin portions that form part of the first skin or the second skin, in cross-section have a dimension that is smaller than a chord or a camber line of the flow profile.

4. The blade according to claim 1, wherein skin portions that form part of the first skin or of the second skin at the most partially overlap each other, viewed in cross-section.

5. The blade according to claim 4, wherein, when considered in cross-section, a first skin portion that forms part of the first skin or the second skin, respectively, covering a second skin portion that forms part of the first skin or the second skin, respectively, ends at greater distance from the trailing edge than the second skin portion does.

6. The blade according to claim 1, wherein a filler of a foam material is situated between the skins and the bodies.

7. The blade according to claim 1, wherein at least one spar is provided, the at least one spar comprising at least the respective body portion of a layer of material which body portion extends between and transverse to the skins and at least a skin portion that forms part of the first skin or of the second skin.

8. The blade according to claim 7, further comprising a supporting layer of material that is enclosed between two body portions of a respective layer of material.

9. The blade according to claim 7, wherein at least two spaced apart spars are provided, the spars and an area of the skins extending in between them defining a torsion box.

10. The blade according to claim 1, wherein a number of skin portions in a central area of the first skin or the second skin, respectively, which central area is situated spaced apart from the leading edge and the trailing edge, is higher than a number of skin portions in an edge area of the first skin or the second skin, respectively, which edge area is adjacent to the leading edge or the trailing edge.

11. The blade according to claim 1, wherein between the two overlapping skin portions of the layers of material comprising a body portion between the skins and at least a skin portion that forms part of the first skin or of the second skin, an additional skin portion is situated that exclusively extends within the first skin or exclusively within the second skin.

12. The blade according to claim 1, wherein of at least three consecutive layers of material that each comprise a body portion between and transverse to the skins as well as at least a skin portion that forms part of the first skin or of the second skin, the skin portions having respective consecutive ends that are spaced apart from each other in the first skin or the second skin, respectively.

13. The blade according to claim 1, wherein, of layers of material that comprise a body portion between and transverse to the skins as well as at least a skin portion that forms part of the first skin or of the second skin, at least the first skin portion has an end that is free at an exterior of the first skin or the exterior of the second skin, respectively.

14. The blade according to claim 1, wherein layers of material extend continuously between the trailing edge and the leading edge, which continuous layers of material cover the skin portions of the layers of material that comprise a body portion between the skins and at least a skin portion that forms part of the first skin or a skin portion that forms part of the second skin.

15. The blade according to claim 1, wherein layers of material comprise layers of fiber material impregnated with a matrix material, wherein a fiber direction of a layer of fiber material is oriented parallel with, at ±45° relative to, or at 90° relative to the cross-section defining the flow profile.

16. The blade according to claim 1, configured as an aerodynamic blade for exposure to an air flow or gas flow, wherein the first skin forms an underpressure skin and the second skin forms an overpressure skin, and wherein a camber line of the flow profile is curved.

17. The blade according to claim 16, configured as one of: a vane for a wind turbine, an airfoil for an airplane, a steering surface for an airplane, a flap/aileron for an airplane, a winglet for an airplane, or a propeller blade for an airscrew.

18. The blade according to claim 1, wherein the flow profile at the leading edge has a curvature with a first radius of curvature that is larger than a second radius of curvature at the trailing edge.

19. The blade according to claim 1, wherein the leading edge and the trailing edge extend between two opposite blade ends, at least one body portion at one of the blade ends being provided with coupling means for coupling the blade to a support structure.

* * * * *